P. B. WHITNEY.
STORAGE BATTERY.
APPLICATION FILED JAN. 21, 1915.
1,136,075.
Patented Apr. 20, 1915.
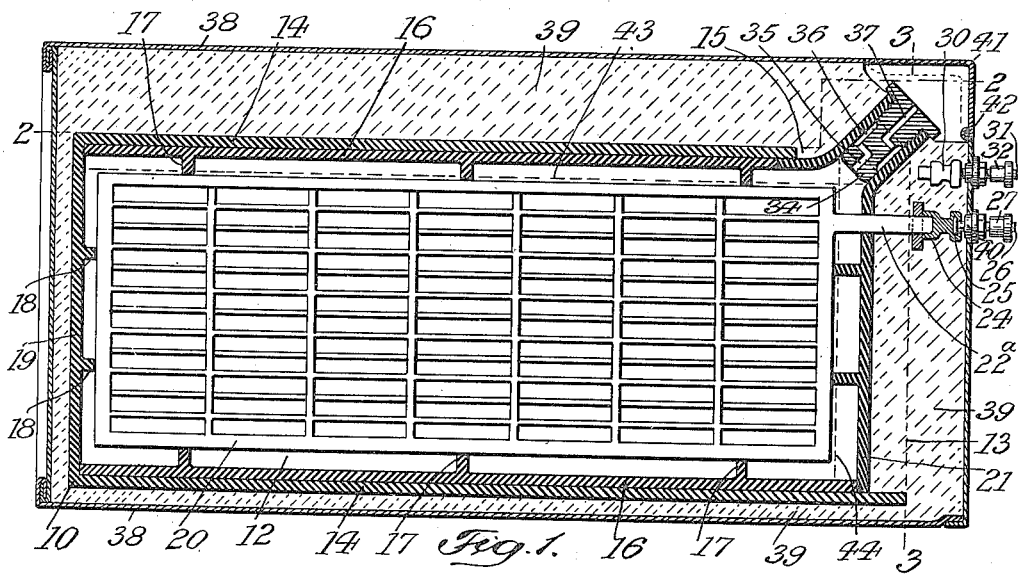
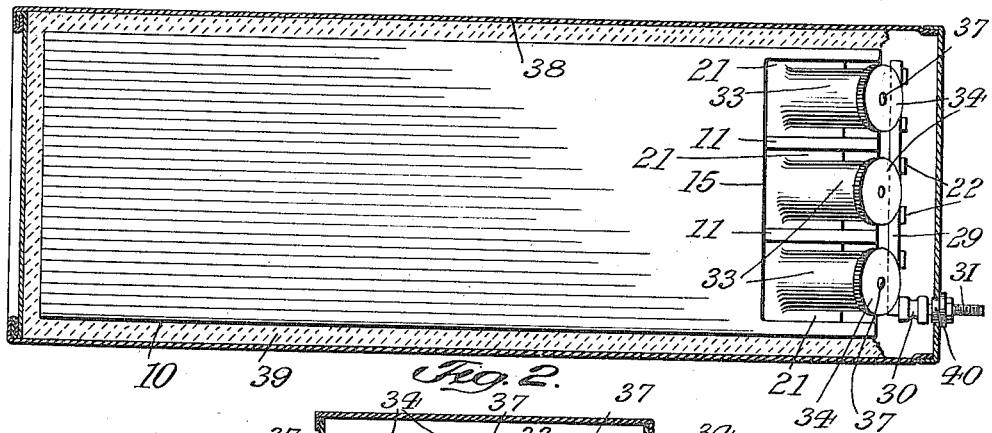
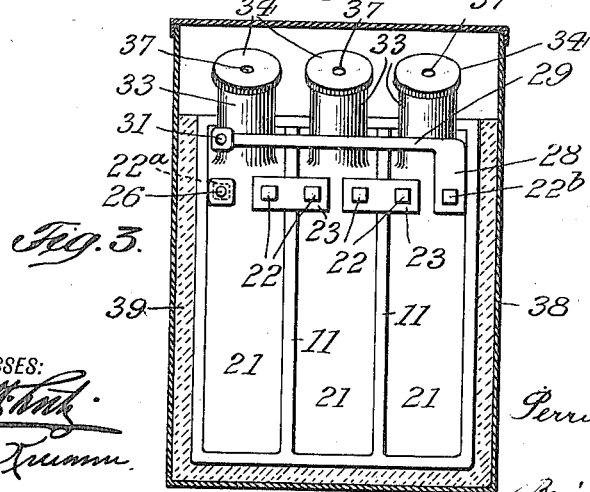
WITNESSES:
INVENTOR
Perrin B. Whitney
BY
ATTORNEYS

UNITED STATES PATENT OFFICE.

PERRIN B. WHITNEY, OF NEW YORK, N. Y., ASSIGNOR TO MESINGER-WHITNEY ELECTRIC COMPANY, INC., OF NEW YORK, N. Y.

STORAGE BATTERY.

1,136,075.  Specification of Letters Patent.  Patented Apr. 20, 1915.

Application filed January 21, 1915. Serial No. 3,519.

*To all whom it may concern:*

Be it known that I, PERRIN B. WHITNEY, a citizen of the United States, residing at New York city, county of Bronx, State of New York, have invented certain new and useful Improvements in Storage Batteries, of which the following is a specification.

This invention relates to a novel storage battery which is more particularly adapted to be used in conjunction with the light, etc., circuits of automobiles, motor cycles and similar vehicles.

The object of the present invention is to provide a storage battery that may be used in an upright as well as in a horizontal position without permitting the electrolyte to escape although the interior of the battery is in constant communication with the atmosphere in either position of said battery.

The invention further comprises details of construction as more fully pointed out in the accompanying specification and claims.

In the accompanying drawings: Figure 1 is a longitudinal section through a storage battery embodying my invention; Fig. 2 a longitudinal section on line 2—2, Fig. 1; and Fig. 3 a cross section on line 3—3, Fig. 1, with the sealing mass omitted.

My improved storage battery comprises essentially a substantially oblong box 10 made of suitable insulating material and shown to be subdivided by partitions 11 into three compartments or cells 12. Box 10 is open at one end as at 13 and one of the box sides 14 is provided with a cut-out 15 adjoining opening 13. Into each cell 12 is fitted a pair of opposed spacers 16 likewise made of insulating material and provided with inwardly extending ribs 17 which, in conjunction with similar ribs 18 formed on the bottom 19 of the cell, constitute the means for supporting the usual lead plates or other active electrodes 20. The openings of the several cells 12 formed jointly by the opening 13 and cut-out 15 of box 10 are normally closed by substantially L-shaped covers 21 firmly resting upon the outer edges of spacers 16. Each of the plates 20 is provided with an integral lug 22 projecting outwardly through a corresponding opening of cover 21. The three cells of the storage battery are preferably connected in series for which purpose the lugs 22 flanking each partition 11 are connected by lead bridges 23 tightly driven on these lugs. On one of the two outer lugs say, on lug 22$^a$ is snugly fitted a cap 24 made of lead into which cap is cast in the head 25 of a binding post 26 carrying a clamping nut 27. To the other outer lug 22$^b$ is firmly attached a lead conductor 28 having an arm 29 that extends across all of the cells 12, the outwardly extending bent end of said arm carrying a cap 30 that is a substantial duplicate of cap 24, cap 30 being provided with a cast in binding post 31 engaged by a clamping nut 32.

Each of the covers 21 is provided at its corner with an interiorly threaded nipple 33 extending obliquely at an obtuse angle of about 135° to the adjoining cover-walls. Into nipple 33 is tapped a plug 34 provided with an inner angular bore 35 opening into a circumferential recess 36 of said plug, said recess communicating in turn, through an outer angular bore 37 with the atmosphere.

After the parts above described have been properly assembled to form the complete box as shown in Fig. 1, said box is inserted into a sheet metal casing 38 of somewhat larger dimensions than the box. Casing 38 is then filled with wax or another sealing mass 39, so that the box is completely surrounded thereby only exposing the nipples 33 while the caps 24, 30 and their connections with lead plates 20 are also embedded within said mass. The binding posts 26, 31 project outwardly through insulating bushings 40 fitted into corresponding apertures of casing 38. The screw plugs 34 are rendered accessible for replenishing the electrolyte, through an angular lid 41 hinged to casing 38 as at 42.

When the cells 12 are properly filled with the electrolyte the same should extend to a level 43 in case the battery is used in its horizontal position. In this way the passages 35, 36, 37 permit the necessary communication between the interior of the cells and the atmosphere to permit the escape of acid vapors during charging, etc. When the battery is used in an upright position, the electrolyte fills the cells to about a level 44, in which position communication is also maintained between the interior of the cells and the atmosphere.

It will thus be seen that my improved storage battery is of solid construction, precludes any leakage of the electrolyte, and may be mounted in either a horizontal or an upright position so as to be readily fitted into the space available for this purpose with automobiles, motor cycles, etc., without interfering in the least, with the proper operation of the battery.

I claim:—

1. A storage battery comprising an oblong box adapted to contain active plates and an electrolyte, and a nipple protruding at one of the box-edges and deflected at an obtuse angle to each of the two sides of the box forming said edge.

2. A storage battery comprising an oblong box adapted to contain active plates and an electrolyte, a nipple protruding at one of the box-edges and deflected at an obtuse angle to each of the two sides of the box forming said edge, and an apertured plug fitted into said nipple.

3. A storage battery comprising an oblong box, that has an open end, partitions dividing the box into a plurality of cells, covers for closing said cells, and nipples protruding at the cover-edges and deflected at an obtuse angle to each of the two cover sides.

4. A storage battery comprising an oblong box that has an open end, partitions dividing the box into a plurality of cells, a cover provided for each cell, an interiorly threaded nipple extending obliquely outward from one edge of said cover, and a plug tapped into said nipple and having a tortuous vapor passage.

5. A storage battery comprising an oblong box that has an open end, partitions dividing the box into a plurality of cells, lead plates accommodated within said cells and having outwardly projecting lugs, a cover provided for each cell and having perforations that accommodate the lugs, a nipple extending obliquely outward from one edge of said cover, and a plug removably fitted into said nipple and having a tortuous vapor passage.

6. A storage battery comprising an oblong box that has an open end, partitions dividing the box into a plurality of cells, lead plates accommodated within said cells and having outwardly projecting lugs, a cover provided for each cell and having perforations that accommodate the lugs, a nipple extending obliquely outward from one edge of said cover, a plug removably fitted into said nipple and having a tortuous vapor passage, conductive bridges that connect the lugs of the plates located adjacent to each partition, and binding posts conductively connected to the outer lugs.

7. A storage battery comprising an oblong box that has an open end, partitions dividing the box into a plurality of cells, ribbed spacers inserted into the cells, lead plates engaging said spacers and having outwardly extending lugs, a cover provided for each cell and having perforations that accommodate the lugs, a nipple extending obliquely outward from one edge of said cover, and a plug removably fitted into said nipple and having a tortuous vapor passage.

8. A storage battery comprising an oblong box that has an open end, partitions dividing the box into a plurality of cells, a cover provided for each cell, an interiorly threaded nipple extending obliquely outward from one edge of said cover, a plug tapped into said nipple and having a tortuous vapor passage, a casing loosely surrounding the box and having an opening opposite the nipples, a sealing mass completely filling the space between the box and casing and leaving the nipples exposed, and a lid for closing the box-opening.

PERRIN B. WHITNEY.

Witnesses:
AUGUST ERB,
E. SCHILTINGA.